United States Patent
Durham et al.

(10) Patent No.: US 7,804,852 B1
(45) Date of Patent: *Sep. 28, 2010

(54) SYSTEMS AND METHODS FOR DEFINITION AND USE OF A COMMON TIME BASE IN MULTI-PROTOCOL ENVIRONMENTS

(76) Inventors: Douglas Durham, 1788 Lark La., Sunnyvale, CA (US) 94087; Roumel Garcia, 3311 College Ave., Vallejo, CA (US) 94589; Jim Stager, 23922 SW. Newland Rd., Wilsonville, OR (US) 97070; Dominic Coupal, 1700 Halford Ave., Apt. 325, Santa Clara, CA (US) 95051

( * ) Notice: Subject to any disclaimer, the term of this patent is extended or adjusted under 35 U.S.C. 154(b) by 1823 days.

This patent is subject to a terminal disclaimer.

(21) Appl. No.: 10/764,095

(22) Filed: Jan. 23, 2004

Related U.S. Application Data

(60) Provisional application No. 60/442,608, filed on Jan. 24, 2003, provisional application No. 60/442,607, filed on Jan. 24, 2003.

(51) Int. Cl.
*H04J 3/16* (2006.01)
*H04B 1/10* (2006.01)
*G06F 1/12* (2006.01)
*G06F 11/00* (2006.01)

(52) U.S. Cl. .................. 370/469; 375/356; 713/400; 714/39

(58) Field of Classification Search ............ 375/356, 375/375, 362, 354; 370/503, 469, 481, 252, 370/244–245, 512, 509–510, 516–518, 522; 714/712, 45, 37; 713/178, 400
See application file for complete search history.

(56) References Cited

U.S. PATENT DOCUMENTS

| 5,373,501 | A |   | 12/1994 | Roland |
| 5,535,193 | A | * | 7/1996  | Zhang et al. ............... 370/253 |
| 5,590,116 | A | * | 12/1996 | Zhang ........................ 370/253 |
| 5,748,098 | A |   | 5/1998  | Grace |
| 5,850,388 | A |   | 12/1998 | Anderson et al. |
| 5,896,427 | A | * | 4/1999  | Muntz et al. ............... 375/372 |
| 5,920,711 | A |   | 7/1999  | Seawright et al. |
| 5,982,753 | A |   | 11/1999 | Pendleton et al. |
| 6,070,248 | A | * | 5/2000  | Yu et al. .................... 713/501 |
| 6,125,404 | A |   | 9/2000  | Vaglica et al. |
| 6,148,420 | A | * | 11/2000 | Schlater et al. ............. 714/39 |
| 6,269,136 | B1| * | 7/2001  | Hansen et al. ............. 375/354 |
| 6,335,931 | B1| * | 1/2002  | Strong et al. .............. 370/390 |
| 6,370,159 | B1| * | 4/2002  | Eidson ....................... 370/503 |

(Continued)

OTHER PUBLICATIONS

U.S. Appl. No. 10/764,218, filed Jan. 23, 2004, Durham, et al.

(Continued)

*Primary Examiner*—Aung S Moe
*Assistant Examiner*—Redentor M Pasia

(57) ABSTRACT

Systems, device and methods are provided for determining a reference clock frequency for use by a multi-protocol analyzer in connection with a multi-protocol communications system. Initially, the clock frequencies for each of the links in the multi-protocol communications system are determined. The link clock frequencies are then used as a basis for determining the frequency of the reference clock. While the reference clock frequency is based upon the link clock frequencies, the reference clock frequency is different from each of the reference clock frequencies.

8 Claims, 9 Drawing Sheets

U.S. PATENT DOCUMENTS

| | | | |
|---|---|---|---|
| 6,507,923 B1* | 1/2003 | Wall et al. | 714/712 |
| 6,526,044 B1 | 2/2003 | Cookmeyer et al. | |
| 6,665,316 B1* | 12/2003 | Eidson | 370/509 |
| 6,707,794 B1 | 3/2004 | Leong et al. | |
| 6,931,574 B1 | 8/2005 | Coupal et al. | |
| 7,003,781 B1 | 2/2006 | Blackwell | |
| 7,042,908 B1* | 5/2006 | Mayer | 370/503 |
| 7,133,416 B1* | 11/2006 | Chamdani et al. | 370/466 |
| 7,173,943 B1* | 2/2007 | Borchew et al. | 370/474 |
| 7,228,348 B1 | 6/2007 | Farley et al. | |
| 7,257,736 B2 | 8/2007 | Dunn et al. | |
| 2002/0136232 A1* | 9/2002 | Dudziak et al. | 370/445 |
| 2002/0194393 A1 | 12/2002 | Hrischuk et al. | |
| 2003/0074440 A1 | 4/2003 | Grabarnik et al. | |
| 2004/0049706 A1* | 3/2004 | Strong | 713/400 |
| 2004/0054776 A1 | 3/2004 | Klotz et al. | |
| 2004/0233910 A1 | 11/2004 | Chen et al. | |
| 2005/0060402 A1 | 3/2005 | Oyadomari et al. | |

OTHER PUBLICATIONS

U.S. Appl. No. 10/764,059, filed Jan. 23, 2004, Durham, et al.
U.S. Appl. No. 10/764,218, filed Apr. 16, 2008, Office Action.
U.S. Appl. No. 10/764,059, filed Aug. 7, 2008, Restriction Requirement.
U.S. Appl. No. 10/764,059, filed Sep. 26, 2008, Office Action.
U.S. Appl. No. 10/764,059, filed May. 27, 2009, Office Action.
U.S. Appl. No. 10/764,059, filed Dec. 18, 2009, Office Action.
U.S. Appl. No. 10/764,218, filed Feb. 17, 2010, Office Action.
U.S. Appl. No. 10/764,218, filed Jun. 18, 2009, Office Action.
U.S. Appl. No. 10/764,218, filed Dec. 2, 2008, Office Action.

* cited by examiner

SYSTEMS AND METHODS FOR DEFINITION AND USE OF A COMMON TIME BASE IN MULTI-PROTOCOL ENVIRONMENTS

RELATED APPLICATIONS

This application claims the benefit of United States Provisional Patent Application Ser. No. 60/442,608, entitled SORTING OF DATA USING TIMESTAMPS TO CAPTURE AND ANALYZE DATA OF MULTIPLE PROTOCOLS, and filed on Jan. 24, 2003, as well as the benefit of United States Provisional Patent Application Ser. No. 60/442,607, entitled SYNCHRONIZATION OF CARDS FOR CAPTURING AND ANALYZING DATA OF MULTIPLE PROTOCOLS, and filed on Jan. 24, 2003, both of which are incorporated herein in their respective entireties by this reference.

BACKGROUND OF THE INVENTION

1. The Field of the Invention

The present invention relates to the evaluation of data events occurring in a communications system. More specifically, embodiments of the present invention are concerned with systems and methods for establishing and using a common time base in connection with the operation of a multi-link protocol analyzer in a multi-protocol communications system.

2. Related Technology

Many data communications systems use a variety of different data transmission mechanisms to enable communication between and among associated subsystems. In general, the type of data transmission mechanism employed in a given situation is determined with reference to the particular tasks desired to be accomplished in connection with that transmission mechanism and associated systems. Each different transmission mechanism, in turn, is associated with a particular transmission, or communication, protocol that defines various parameters concerning the transmission of data in connection with the transmission mechanism. Such communication protocols commonly specify, for example, the manner in which data is encoded onto a transmission signal, the particular physical transmission media to be used with the transmission mechanism, link layers and other attributes.

As suggested above, a single data communications system may use multiple different transmission mechanisms and protocols. As an example, an enterprise may employ a communications system that uses five different data communications protocols, each adapted for a particular situation, wherein the five protocols may include: a first protocol for a high speed, inexpensive short-haul connection on the computer motherboard; a second high-bandwidth protocol for data center transmissions; a third protocol that is suited for efficiently transmitting information across the enterprise local area network ("LAN"); a fourth protocol adapted for high bandwidth, long haul applications; and, finally, a fifth communications protocol suited for data transmission to high performance disk drive storage systems. Thus, the typical communications system comprises a patchwork of different subsystems and associated communications protocols.

In this way, a communications system can be created that makes maximum and efficient use of the functionalities and capabilities associated with various different communications protocols. Further, advances in communications technology, coupled with declining costs, enable such communications systems to be implemented in a relatively cost effective fashion.

While communications systems that include components, devices and subsystems of varying protocols are able to exploit the respective strengths and useful features associated with each of the protocols, such multiple protocol systems can be problematic in practice. This is especially true where problem identification, analysis and resolution are concerned. In particular, the use of multiple communications protocols within the bounds of a single communications system greatly complicates the performance of such processes.

For example, as network data moves from a point of origin to a destination, by way of communication links, or simply "links," the data passes through a variety of devices collectively representing multiple protocols. Typically, each such device modifies the network data so that the data can be transmitted by way of a particular link. However, modification of the data in this way often causes errors or other problems with the data. Such errors may occur as the result of various other processes and conditions as well. Thus, the various communication links in a communications system are particularly prone to introduce, or contribute to the introduction of, data errors. Moreover, data errors and other problems present at one location in the data stream may cause errors or other problems to occur at other locations in the data stream and/or at an other points in the communications system and associated links.

One approach to problem identification, analysis and resolution in communications systems involves capturing a portion of the network data traffic. The captured data can then be retrieved for review and analysis. In some cases, such data capture is performed in connection with a protocol analyzer that includes various hardware and software elements configured and arranged to capture data from one or more communications links in the communications system, and to present the captured data by way of a graphical user interface.

Generally, such multi-link protocol analyzer analyzers, or simply "analyzers," capture data traffic in the communications system over a defined period of time, or in connection with the occurrence of predefined events. Use of the multi-link protocol analyzer thus allows a network administrator or hardware developer to track the progress of selected data as that data moves across the various links in the communications system. Corrupted or altered data can then be identified and traced to the problem link(s), or other parts of the communications system.

Implementation of this functionality, however, requires that a causal relationship be identified between the data captured by way of the various links. In particular, in order to classify event "A" as a possible cause of event "B," it must be shown that event "A" occurred prior in time to event "B." If event "A," or at least a portion of event "A," did not occur prior in time to event "B," then event "A" cannot be the cause of event "B." Accordingly, identification of a causal relationship cannot be performed without knowledge of the order, in time, that the data of interest arrives at a particular destination, or destinations, in the communications system. That is, causal links or relationships between data events occurring on different links within the communications system cannot be identified until the temporal relationship between those data events is known. As discussed below, typical analyzers present a number of problems in this regard.

For example, identification of such causal relationships between data events is complicated by the fact that the data is transmitted at different rates over the different links. As noted earlier, the differing data transmission rates stem from the fact that multiple data communications protocols are employed within a single communications system, where each protocol has a different associated data rate and transmission frequency. Thus, Fibre Channel systems operate at a frequency of about 2 GHz, Infiniband systems operate at a frequency of about 2.5 GHz times 4, and Gigabit Ethernet systems operate at a frequency of about 1 GHz.

Thus, the speed with which a particular portion of data can be transmitted is a function of the frequency of the associated protocol. A comparison of the Gigabit Ethernet ("GigE") and Infiniband protocols serves to illustrate this point. As noted above, GigE systems operate at a frequency of about 1 GHz, while Infiniband systems operate at a frequency of about 2.5 GHz, so that the same amount of information takes about 2.5 times longer to transmit in a GigE system as in an Infiniband system.

In typical data capture operations, the clock of one of the protocols is used as a basis for timestamping of the captured data. The timestamping is performed so that the temporal relationships between captured data events can be determined. However, because each protocol in multi-protocol systems has a different associated clock, the sorting of captured data based upon a timestamp made with reference to a particular protocol clock is frequently inadequate to enable determination of causal relationships between captured data events. This is especially true where it is desired to determine whether an inter-protocol relationship exists between, for example, a data event associated with the Infiniband portion of the system, and a data event associated with the GigE portion of the system.

In the aforementioned example, the GigE protocol is relatively more "coarse" than the Infiniband protocol in that, for a given time period, a GigE system clock increments fewer times than does the Infiniband system clock. Thus, a particular data event may appear relatively longer, or shorter, than another data event, depending upon which clock is selected as the basis for the timestamps. For example, a 2 clock increment GigE data event would be 5 clock increments long in the Infiniband protocol, so that while the respective data events appear to have different lengths, relative to their corresponding protocols, the data events actually have the same time duration in absolute terms.

As the foregoing suggests, the different data rates associated with the communications protocols also compromise the ability to determine start and stop times of particular data events. Of course, this situation is further aggravated where multiple additional communications protocols are employed in a communications system. Thus, in a system that employs multiple communications protocols, the protocol-based timestamping of multiple captured data events makes it difficult, if not impossible, to make accurate and reliable determinations as to absolute and relative data event lengths, and data event start and finish times. As a result, the identification of temporal relationships between data events, such as is required to facilitate time-based sorting and analysis of those data events, is substantially foreclosed.

One possible approach to the determination of temporal relationships and thus, causal relationships, between captured data events is to record a well known timestamp in each data stream. For example, an absolute time reference, such as Coordinated Universal Time ("UTC") (measured in seconds) could be used to make a well known mark in each data stream that can be used as a reference point later. Since each data stream is transmitted at a well known rate, it would seem to be a relatively simple matter to determine any and all causal relationships for all data at any arbitrary point in the data capture. As discussed below however, this approach is problematic, at least because it is based upon the assumption that there is no drift in clock frequency at any of the links.

For example, in each data transmission method, the transmit clock is specified as being a certain rate, but includes a certain amount of acceptable error or deviation from the standard rate. In many specifications, an error of several parts per million is allowed. Further, the transmission error of each link is different, which means that even after a very short period of time, several seconds for example, each link may have a permissible error or deviation of thousands, if not millions, of clocks, or clock increments, from the original time. Moreover, the various clocks are unsynchronized with respect to each other as well. Thus, after the passage of several thousand seconds, there is no virtually way to accurately and reliably determine temporal or causal relationships between and among the data events in the data stream. As an example, one byte that appears to have preceded another byte in the data stream may, in fact, have followed several milliseconds afterwards instead.

In view of the foregoing, and other, problems in the art, what is needed are systems and methods for establishing and using a common time base in connection with the operation of a multi-link protocol analyzer, or a group of single link protocol analyzers, in a multi-protocol communications system. Among other things, the common time base should facilitate timestamping and ordering of captured data events in such a way that temporal relationships between and among captured data events representing multiple protocols can be accurately and reliably identified, notwithstanding differing clock rates, and effects such as clock frequency drift.

BRIEF SUMMARY OF AN EXEMPLARY EMBODIMENT OF THE INVENTION

Generally, embodiments of the present invention are concerned with systems and methods for systems and methods for establishing and using a common time base in connection with a multi-protocol analyzer or group of single link analyzers employed with the operation of a multi-protocol communications system.

In one exemplary implementation of the invention, the multi-protocol communications system includes a multi-link protocol analyzer having a number of link analyzers, each of which is configured to implement various functionalities concerning a corresponding communication link of the multi-protocol communications system. Each communication link is typically associated with a different communications protocol having a characteristic clock frequency.

In operation, one of the link analyzers transmits a trigger and a reference clock to one or more other link analyzers. The transmission of the trigger and reference clock is initiated in response to occurrence of a predefined trigger condition concerning the data stream. In one implementation, the link analyzer that transmits the reference clock also generates the reference clock.

Generally, the reference clock serves as a common time base for operation of a multi-link protocol analyzer in a multi-protocol communications system and has a frequency that is determined with reference to the communications protocol clock frequencies respectively associated with each of the different communications protocols of the multi-protocol communications system. The reference clock frequency is different from, but bears a predetermined relation to, each of the communications protocol clock frequencies.

The reference clock is used by the multi-link protocol analyzer as a basis for timestamping captured data events that may collectively represent a variety of different communications protocols. Because the reference clock frequency is different from all of the communications protocol clock frequencies, the reference clock functions as a common time base for operations of the multi-link protocol analyzer. Consequently, the reference clock timestamps can be used to make determinations regarding, among other things, the relative chronological order of selected data events, as well as the relative timing of selected data events. These, and other, aspects of exemplary embodiments of the invention will become more fully apparent from the following description and appended claims.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only exemplary embodiments of the invention and are not, therefore intended to be considered limiting of its scope, the invention will be described and explained with additional specificity and detail through the use of the accompanying drawings in which.

DETAILED DESCRIPTION OF EXEMPLARY EMBODIMENTS OF THE INVENTION

The exemplary embodiments of the present invention are concerned with systems and methods for the definition and use of a common time base in connection with the operation of a multi-link protocol analyzer in a multi-protocol communications system, or in connection with the operation of a group of single link analyzers. As used herein, a "protocol analyzer" includes both multi-link protocol analyzers, as well as groups of protocol specific analyzers employed in connection with a communications system.

Because the common time base is defined with reference to the communications protocol clock frequencies, also referred to herein as "link clock frequencies," associated with the multi-protocol communications system, the common time base enables the timestamping of captured data events in such a way that determinations can be made concerning the relation between and among captured data events, notwithstanding that the captured data events may implicate a variety of different communications protocols having different respective clock frequencies.

I. Exemplary Operating Environment

Figure 1:
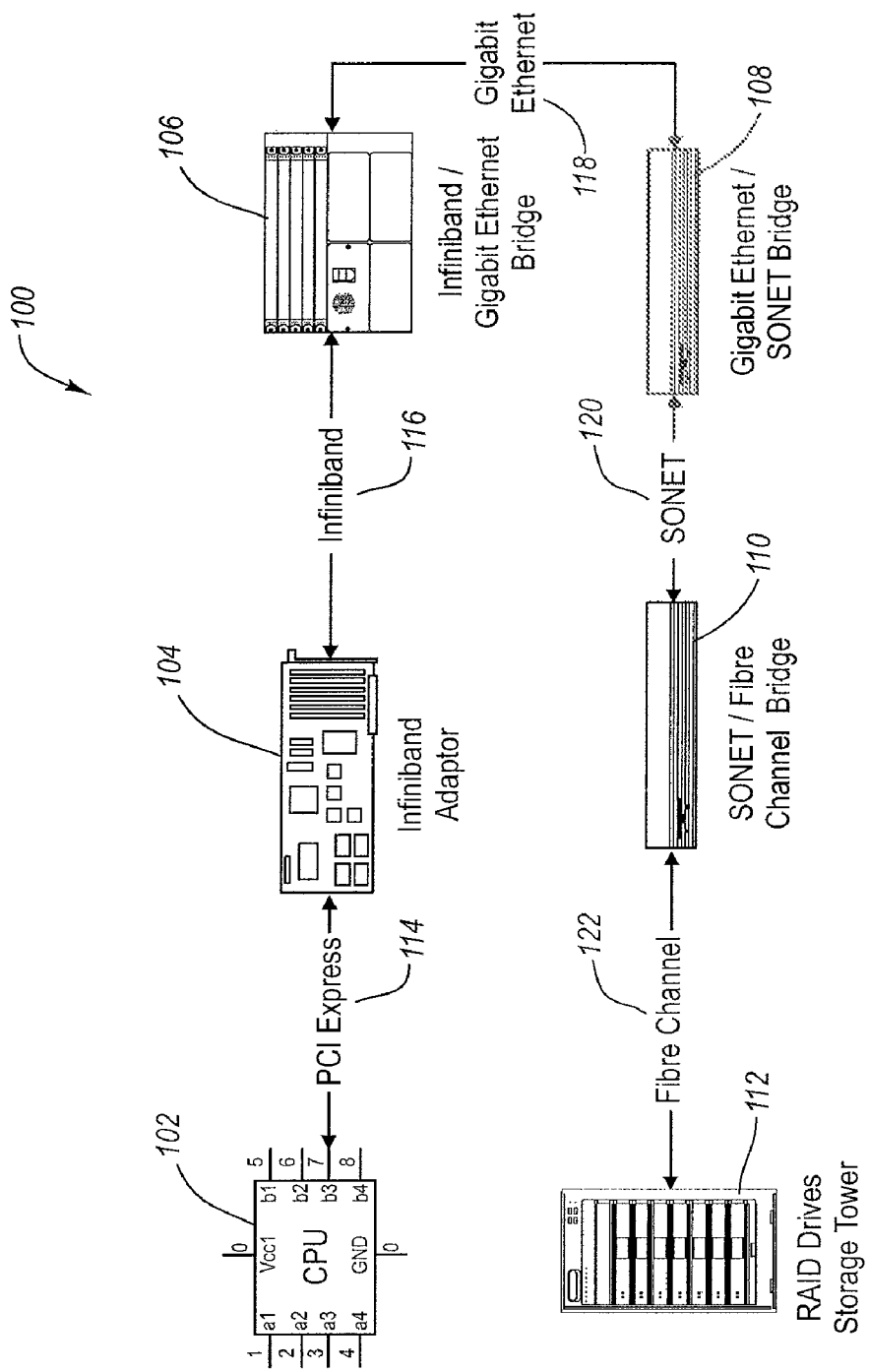
FIG. 1 is a schematic diagram that illustrates aspects of an exemplary data communications system that employs a variety of different data transmission mechanisms and protocols.

With attention now to FIG. 1, details are provided concerning an exemplary operating environment wherein the systems and methods disclosed herein may be employed. In the illustrated arrangement, the operating environment takes the form of a communications system 100 wherein data is transferred between a central processing unit ("CPU") of a computing device and a redundant array of independent disks ("RAID") system. The illustrated communications system 100 is an exemplary operating environment only however and the systems and methods disclosed herein may, more generally, be employed in any other operating environment(s) where such functionality may prove useful.

In the illustrated arrangement, the communications system 100 includes a CPU 102 of a computing device (not shown) configured and arranged for serial communication with an Infiniband adapter 104, an Infiniband/GigE bridge 106, a GigE/synchronous optical network ("SONET") bridge 108, a SONET/Fibre Channel bridge 110, and a RAID drive storage tower 112. Serial connections between these components are provided by a series of communications links. In particular, the CPU 102 and Infiniband adapter 104 are connected by a peripheral component interconnect ("PCI") Express link 114. Downstream of the Infiniband adapter 104, an Infiniband link 116 connects the Infiniband adapter 104 with the Infiniband/GigE bridge 106. In similar fashion, a GigE link 118 connects the Infiniband/GigE bridge 106 with the GigE/SONET bridge 108, while the SONET link 120 connects the GigE/SONET bridge 108 with the SONET/Fibre Channel bridge 110. Finally, a Fibre Channel link 122 connects the SONET/Fibre Channel bridge 110 with the RAID drive storage tower 112.

Each of the aforementioned links conforms with a protocol that has particular strengths and functionality that make the link well suited for use in particular environments. For example, the PCI Express link 114 comprises a high speed, inexpensive short-haul connection, while the Infiniband link 116 employs a high-bandwidth protocol that is useful in data center transmissions. Further, where it is desired to transmit data across an enterprise LAN, the GigE link 118 is often effective. The SONET link 120 is particularly well adapted for high bandwidth, long haul applications. Finally, the Fibre Channel link 1122 enables data transmission to high performance disk drive storage systems such as the RAID drive storage tower 112.

As the foregoing suggests, the communications system 100, as well as other operating environments, comprises a variety of different communications links, systems and devices conforming with any number of communications protocols. Such arrangements are useful because they enable users to more fully exploit the relative strengths of the various communications protocols.

Figure 2:
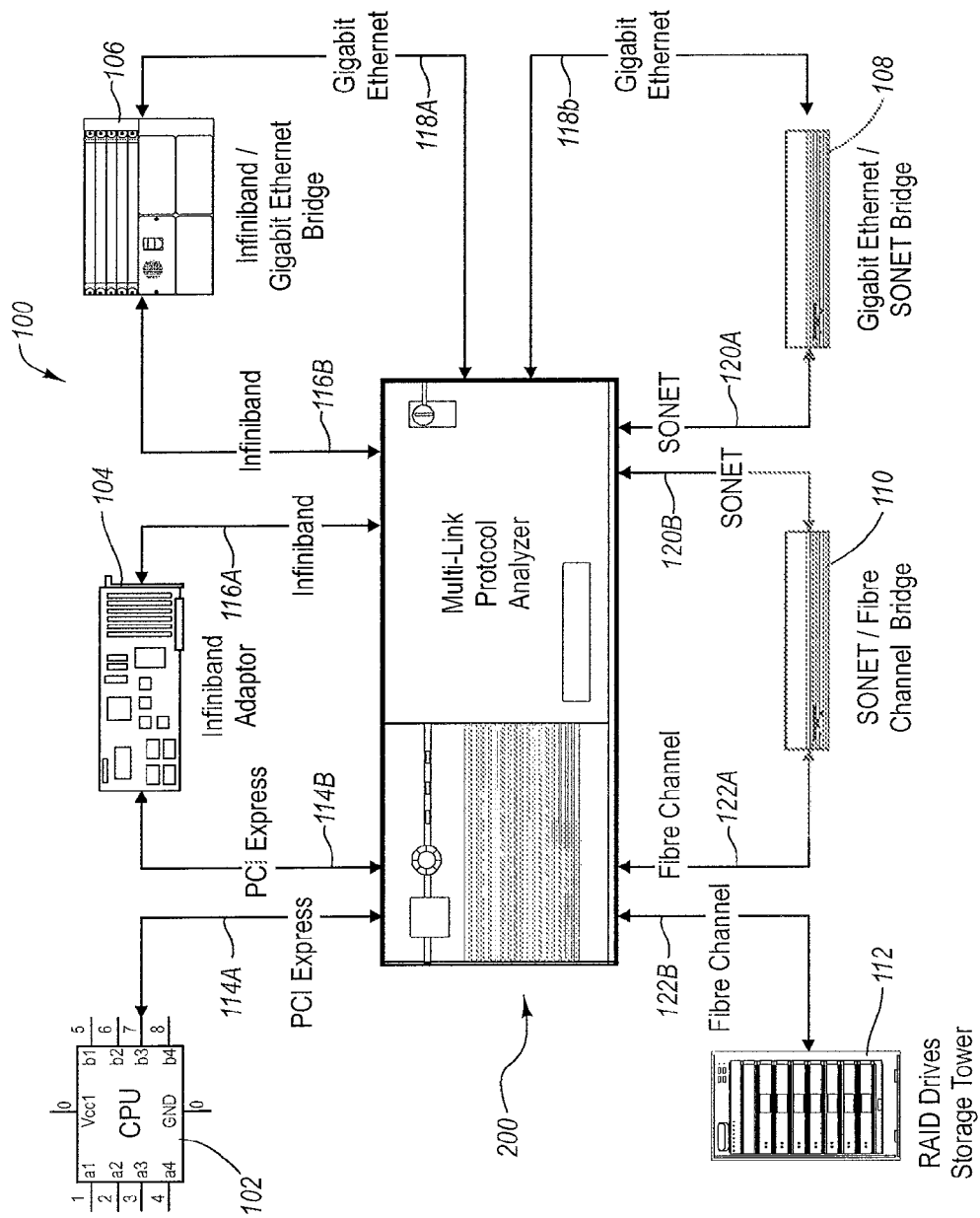
FIG. 2 is a high level schematic diagram of a multi-link protocol analyzer such as may be employed in connection with a multi-protocol communications system.

Directing attention now to FIG. 2, details are provided concerning a multi-link protocol analyzer, or simply "analyzer," 200 suitable for use in connection with the communications system 100, or other operating environment. As indicated in FIG. 2, the multi-link protocol analyzer 200 is disposed in an in-line arrangement with respect to each of the components in the communications system 100. In particular, the PCI Express links 114A and 114B enable routing of data from the CPU 102 through the multi-link protocol analyzer 200 to the Infiniband adapter 104. As suggested in FIG. 2, the Infiniband links 116A and 116B, GigE links 118A and 118B, SONET links 120A and 120B, and Fibre Channel links 122A and 122B likewise enable routing of data through the analyzer 200 and on to the next link in the series.

Thus arranged, the multi-link protocol analyzer 200 receives data traffic from each of the links in the communications system. The illustrated arrangement is exemplary only however and is not intended to limit the scope of the invention. For example, in some implementations, the multi-link protocol analyzer 200 receives data from less than all the links in the communications system 100. Moreover, the multi-link protocol analyzer 200 need not be positioned in an in-line configuration in every case. Accordingly, in some implementations, the multi-link protocol analyzer 200 is configured and arranged to receive network data from a tap, or taps, on one or more of the links. More generally, the multi-link protocol analyzer 200 can be arranged in any way, relative to the communications system 100, that is consistent with the functionality disclosed herein. For example, in some cases, multiple protocol specific analyzers are employed together in place of a single multi-link protocol analyzer.

II. Exemplary Protocol Analyzers

As the foregoing discussion suggests, embodiments of the multi-link protocol analyzer may be configured in a variety of different ways. With attention now to FIG. 3, details are provided concerning an exemplary link analyzer 300 design configured to implement aspects of the functionality disclosed herein. The illustrated link analyzer 300 is one example of a protocol specific link analyzer that may be included as a component of a multi-link protocol analyzer.

In the illustrated embodiment, the link analyzer 300 includes a serializer/deserializer ("SERDES") 302 configured to receive and transmit network traffic by way of a communications link (not shown) of a communications system.

Generally, the SERDES 302 is synchronized with the transmitted clock on the input link. The link analyzer 300 further includes an analyzer front end 304 and analyzer back end 306. Note that as used herein, "network" and "communications system" refer to any system concerned in any way with the communication of data.

Figure 3:
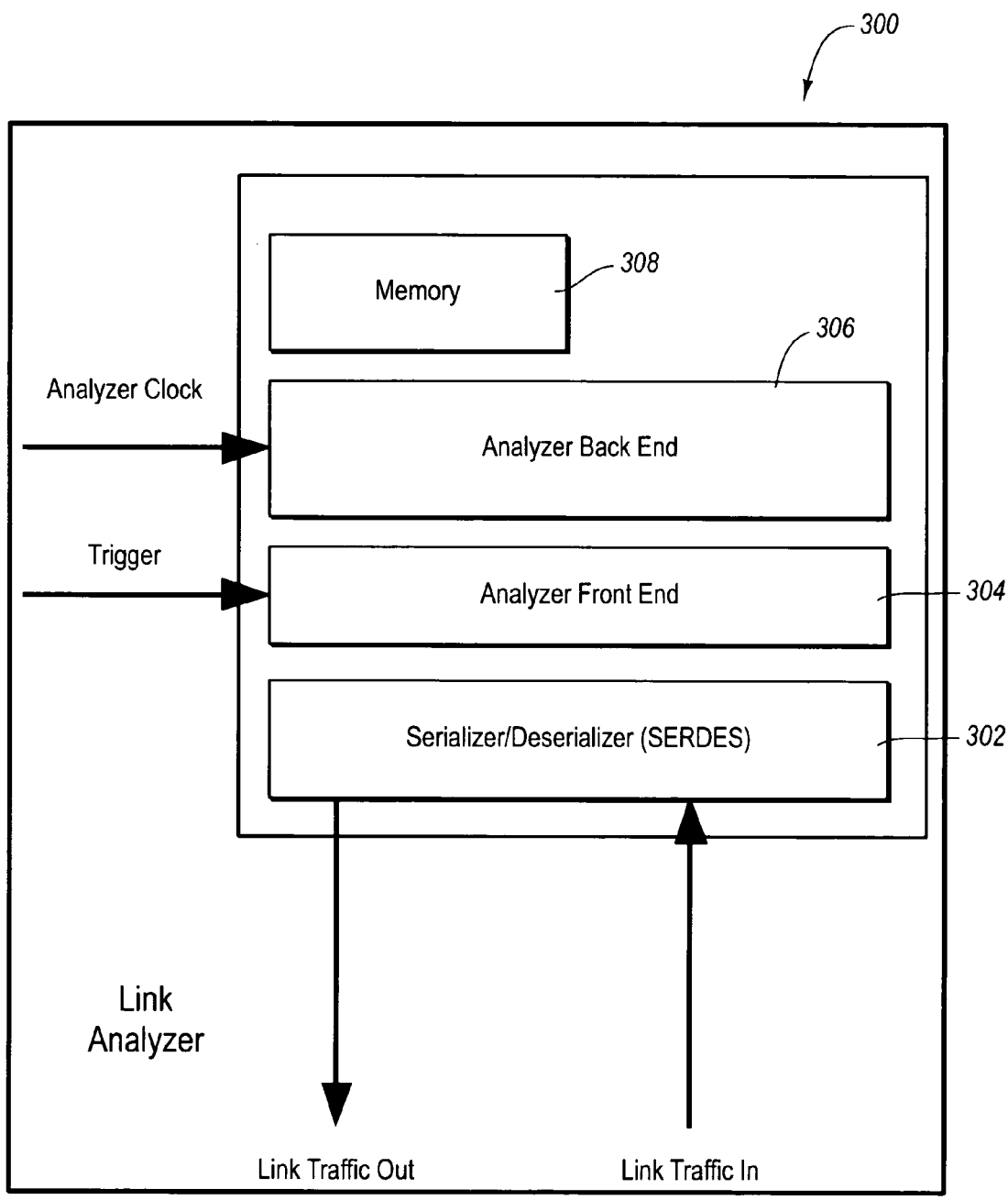
FIG. 3 is a schematic diagram of an exemplary link analyzer such as may be used in the multi-link protocol analyzer illustrated in FIG. 2.

As indicated in FIG. 3, the analyzer front end 304 is configured to receive a "trigger" signal, such as from another link analyzer. Additionally, and as disclosed elsewhere herein, the analyzer front end 304 may also generate and transmit a "trigger" signal in some cases. In similar fashion, the analyzer back end 306 is configured to receive an analyzer clock, which may also be referred to herein as a "reference clock," such as from another link analyzer. As disclosed elsewhere herein, the analyzer back end 306 may also generate and transmit the analyzer clock in some cases.

Finally, the link analyzer 300 includes a memory 308. Generally, the memory 308 enables the link analyzer 300 to store captured data events and other information and materials that relate to the communications link(s) with which the link analyzer 300 is associated.

Figure 4:
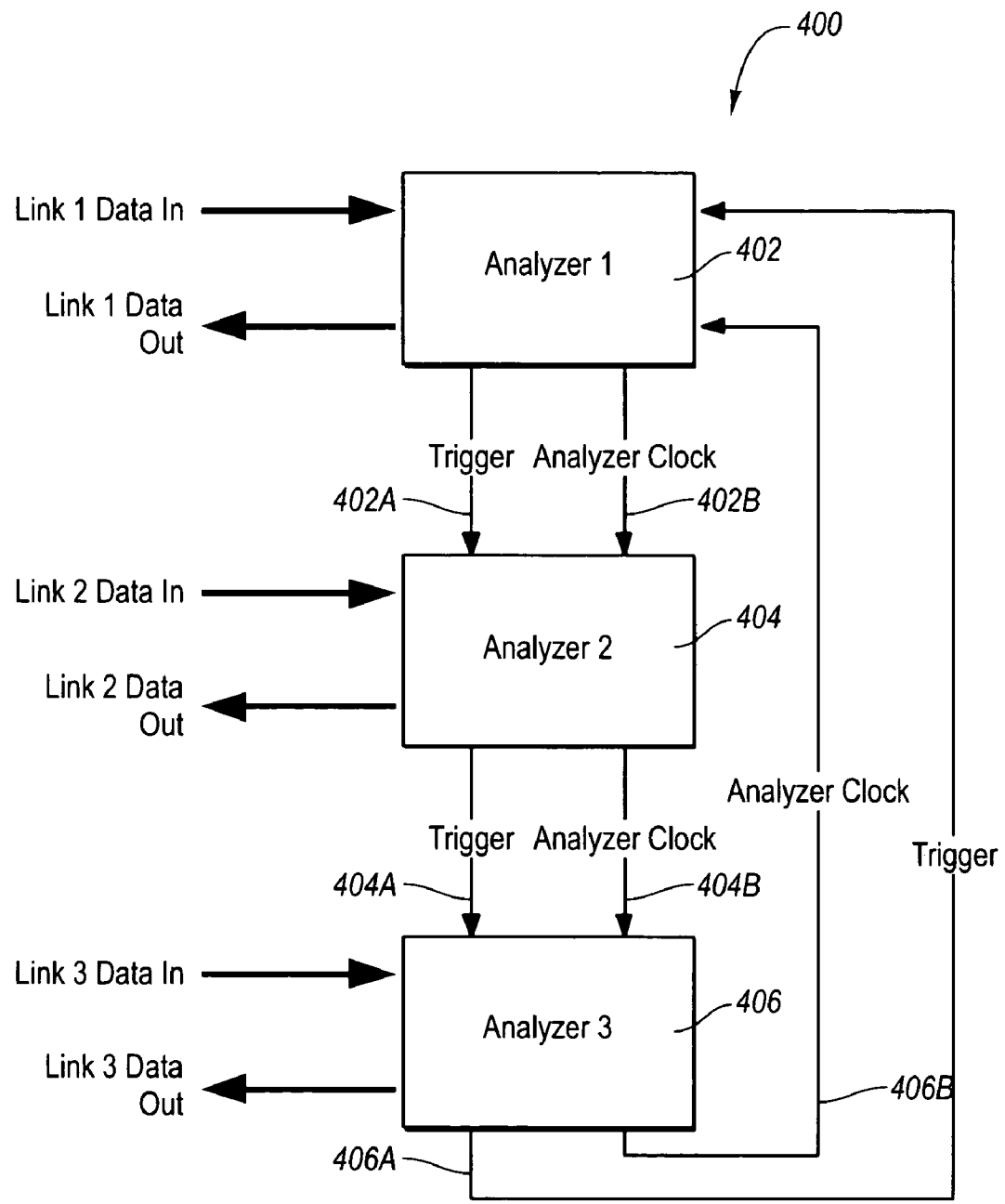
FIG. 4 is a schematic diagram illustrating relationships between a multi-link protocol analyzer and various data transmission mechanisms or links employed in an exemplary communications system.

Directing attention now to FIG. 4, and with continuing reference to FIG. 3, more particular details are provided concerning an exemplary implementation of a multi-link protocol analyzer denoted generally at 400 in FIG. 4. Generally, the multi-link protocol analyzer 400 serves to monitor multiple communication links while maintaining a common time base that permits synchronization or time wise correlation of the timestamps created when the data is captured from the multiple links. Additionally, the multi-link protocol analyzer 400 captures and analyzes data events.

To these ends, the multi-link protocol analyzer 400 includes hardware that is configured to receive and capture data events associated with various communications protocols. Such hardware includes one or more pairs of ports, each of which is configured and arranged to interface with a bi-directional communication link. The multi-link protocol analyzer 400 also includes hardware and/or software that is adapted to recognize the occurrence of predefined events in the data received by way of the various bi-directional communication links.

As indicated in FIG. 4, and noted earlier herein, the multi-link protocol analyzer 400 includes multiple protocol specific devices, or link analyzers, which may also be referred to as cards, blades, boxes, or other devices. Generally, each of such devices is adapted for use with a data stream corresponding to a particular protocol and may be implemented in a modular or interchangeable form so as to permit the multi-link protocol analyzer 400 to be modified or adapted for use with various types of communications systems.

In the particular implementation illustrated in FIG. 4, the multi-link protocol analyzer 400 includes a first link analyzer 402, a second link analyzer 404 and a third link analyzer 406 arranged in series with each other. Exemplarily, each of the link analyzers 402, 404 and 406 is configured for use in connection with a different communications link and corresponding protocol.

The link analyzer 402 is arranged in an in-line configuration so as to receive data from a communications link "1" input, and to pass the received data to a corresponding communications link "1" output. As disclosed in further detail elsewhere herein, the received link "1" data is examined by the link analyzer 402 for the presence of one or more trigger conditions which, if detected by the link analyzer 402, cause the generation and transmission of a trigger signal 402A to the link analyzers 404 and 406.

Contemporaneously with generation and transmission of the trigger signal 402A, some implementations of the link analyzer 402 generate and transmits an analyzer, or reference, clock signal 402B. The analyzer clock, or "reference clock," signal 402B is protocol independent and serves as a common base or reference for the timestamping of data events captured in connection with the occurrence of one or more triggering events. As used herein, "reference clock" refers to a clock that may be defined with reference to, or based upon, one or more communications protocols and associated communications protocol clocks employed in the same system as the reference clock, but which is nonetheless distinct and different from any of such protocol clocks.

It should be noted that systems and methods for the use of such a reference clock in connection with timestamp based sorting, display and evaluation of captured data events are disclosed and claimed in U.S. patent application Ser. No. 10/764,218, and entitled SYSTEMS AND METHODS FOR TIME BASED SORTING AND DISPLAY OF CAPTURED DATA EVENTS IN A MULTIPLE PROTOCOL COMMUNICATIONS SYSTEM, filed the same day herewith and incorporated herein in its entirety by this reference.

As further indicated in FIG. 4, the link analyzer 402 is also configured to receive, either directly or indirectly, a trigger signal and analyzer clock signal from the link analyzer 406. The link analyzers 404 and 406 are similarly configured to transmit and receive trigger and analyzer clock signals. Further, the operation of link analyzers 404 and 406 concerning link "2" data and link "3" data, respectively, is analogous to the operation of link analyzer 402 with respect to link "1" data.

Thus, for example, in the event that the link analyzer 404 detects a trigger condition in the link "2" data, the link analyzer 404 generates and transmits trigger 404A and analyzer clock 404B. In like fashion, if the link analyzer 406 detects a trigger condition in the link "3" data, the link analyzer 406 generates and transmits trigger 406A and analyzer clock 406B.

It should be noted that while the link analyzers 402, 404 and 406 are shown in FIG. 4 as being arranged in serial fashion, the scope of the invention is not so limited. In some implementations, the link analyzers 402, 404 and 406 are arranged so that a trigger and/or clock signal generated by one link analyzer is propagated in parallel to the other link analyzers in the system.

III. Aspects of Exemplary Time Bases

Figure 5:
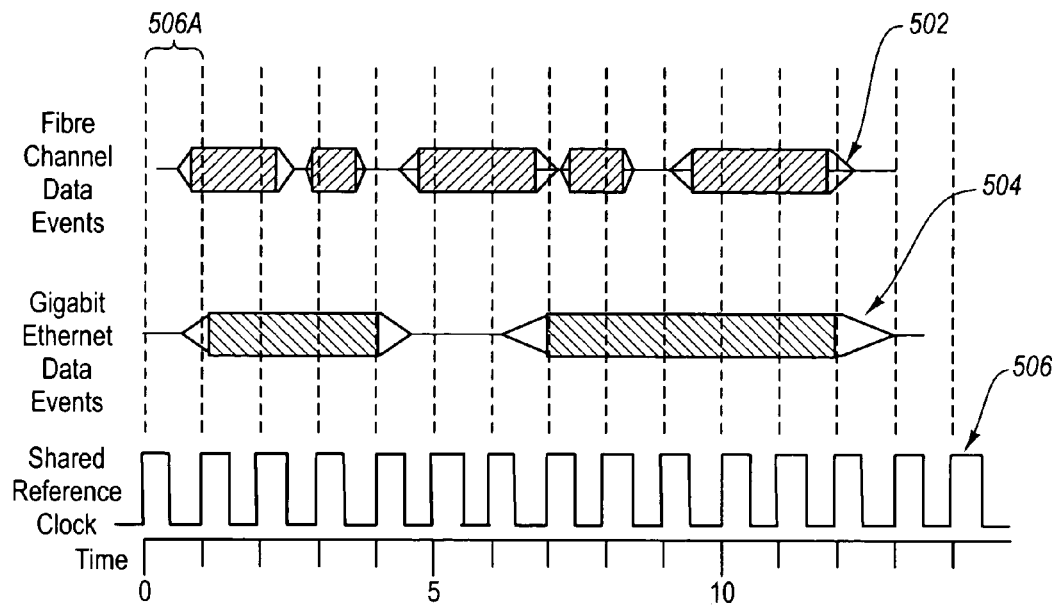
FIG. 5 is a schematic view illustrating relationships between data events associated with various communications protocols, as well as the relationships between the data events and a reference clock.

Directing attention now to FIG. 5, a diagram is provided that generally illustrates aspects of the relationships between and among an exemplary reference clock and data events associated with the Fibre Channel and Gigabit Ethernet protocols. It should be noted in connection with FIG. 5 that the Fibre Channel and Gigabit Ethernet data events are indicated for illustrative purposes only, and the scope of the invention is not limited for use in connection with any particular data event, protocol, or combination of protocols.

In FIG. 5, the upper two traces 502 and 504 represent a series of data events sent across, respectively, a Fibre Channel link and a Gigabit Ethernet link of a multi-protocol communications system. In the illustrated example, the various data events start and finish at a variety of different times, and the number and duration of the data events varies widely as well. As noted elsewhere herein, the clock frequencies of the different communications protocols are different as well. Nonetheless, use of the common time base embodied by the reference clock enables these disparities to be overcome.

In general, the reference clock 506 is defined with reference to, but runs independently of, the communications protocol clocks employed in the multi-protocol communications system. Thus, as indicated in FIG. 5, data events are captured on reference clock boundaries and not on boundaries specified by any particular link, or links.

More particularly, the reference clock 506 defines the increments in time for the multi-link protocol analyzer. Any data event that begins somewhere within a particular reference clock interval 506A is considered to have started at the beginning of that reference clock interval. If two data events begin in the same reference clock interval, those data events are considered by the multi-link protocol analyzer to have begun simultaneously. In this way, information concerning the temporal relationship between data events is preserved. The small amount of error introduced by moving data event boundaries to that of the reference clock is of negligible effect, since the reference clock has a higher frequency than any of the data link clocks, as discussed in further detail below.

IV. Definition of Exemplary Time Bases

As noted earlier herein, the reference clock serves as a common time base or reference for the timestamping of data events captured in connection with the occurrence of one or more triggering events. However, while the reference clock has a frequency that is different from the frequency of any of the communications protocol clocks, the reference clock is defined based upon one or more of such communications protocol clocks.

More particularly, the various communications protocol clock frequencies are used as a basis to determine or define a suitable reference clock frequency. In this way, the reference clock frequency is tailored to the particular multi-protocol communications system wherein it will be employed. Further, the reference clock can also be tailored so as to facilitate the gathering of particular types of information concerning captured data events.

With respect to exemplary operating environments, reference clocks such as those disclosed herein are particularly well suited for use in connection with multi-protocol link analyzers, examples of which are illustrated in FIGS. 2 and 4. Additionally, such reference clocks may likewise be employed with systems that include multiple discrete link analyzers, rather than a single multi-protocol link analyzer device.

Figure 6:
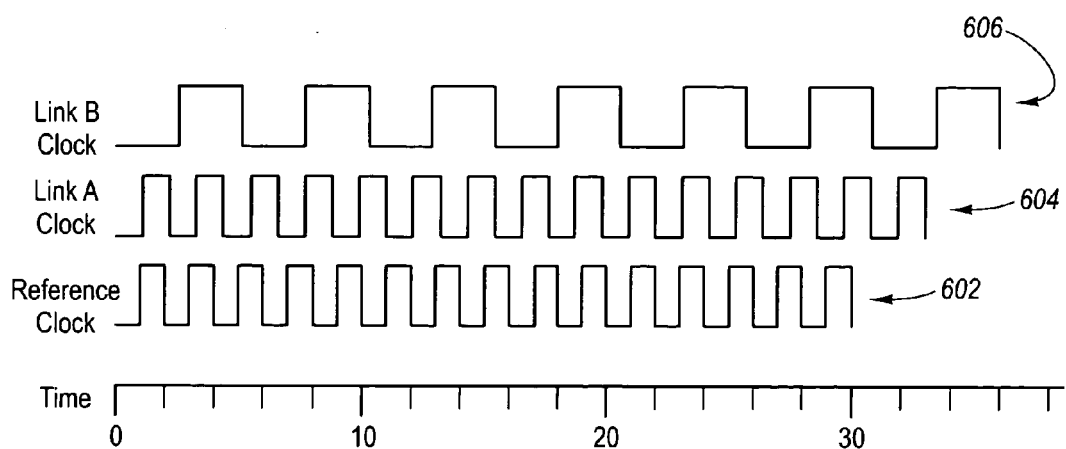
FIG. 6 is a schematic view illustrating aspects of an exemplary reference clock as the reference clock relates to two different protocol clocks.
Figure 7:
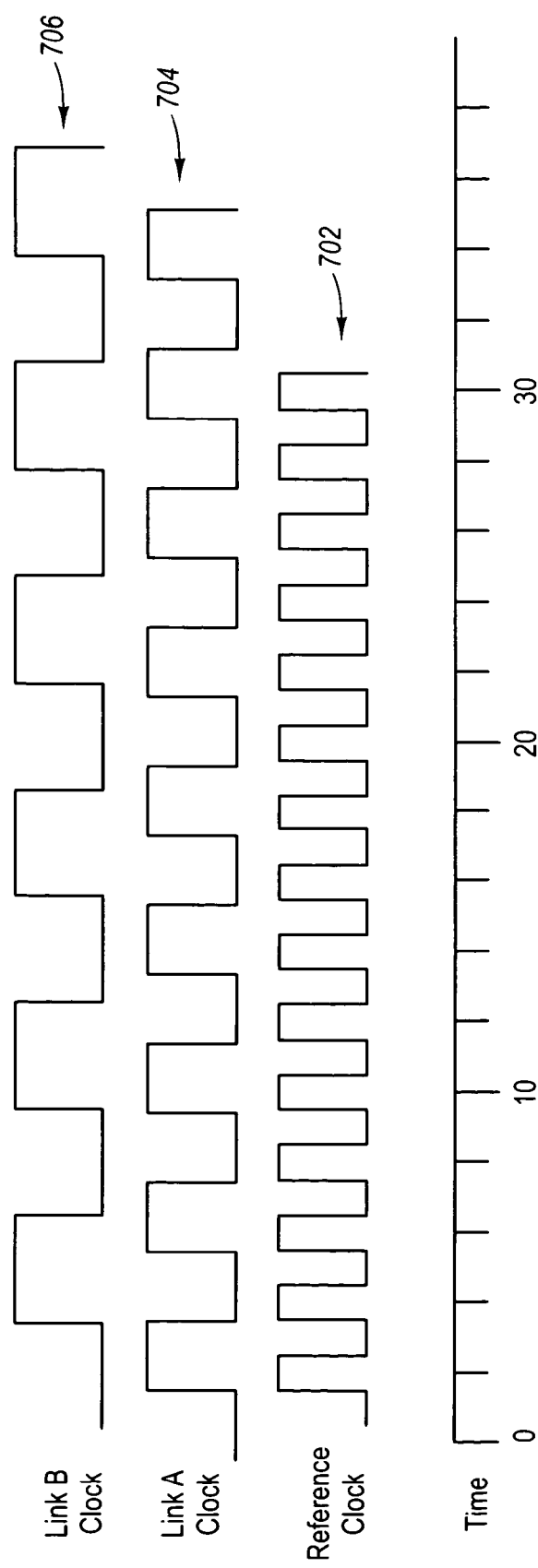
FIG. 7 is a schematic view illustrating aspects of another exemplary reference clock as the reference clock relates to two different protocol clocks.

Directing attention now to FIGS. 6 and 7, details are provided concerning some exemplary reference clocks suitable for use in connection with multi-protocol communications systems. With particular attention first to FIG. 6, an arrangement is indicated where a reference clock 602 runs in a multi-protocol communications system that includes a link "A" clock 604 and a link "B" clock 606. In the illustrated arrangement, the link "A" clock 604 has a relatively higher frequency than the link "B" clock 606. Further, the reference clock frequency is selected to be higher than the frequencies of both the link "A" clock 604 and the link "B" clock 606. By defining the reference clock 602 frequency in this way, the chronological ordering of data events can be preserved to within a word, since any data event beginning during any reference clock cycle is considered to have occurred at the beginning of the reference clock cycle. Moreover, once the chronological ordering of data events is known, analyses can readily be performed by the multi-link protocol analyzer as to the existence and nature of causal and other relationships between and among captured data events.

In some cases, it may be desired to obtain additional information concerning the relationships between and among various captured data events. For example, it is often useful to be able to determine the particular timing of captured data events relative to each other. Directing attention now to FIG. 7, details are provided concerning a reference clock 702 directed to this end.

As suggested in FIG. 7, if it is desired to preserve information concerning the relative timing of data events concerning one or more of the links, the frequency of the reference clock 702 must satisfy a specific relationship to the frequencies of each of the link clocks. More particularly, the frequency of the reference clock must be an integer multiple of each of the link clock frequencies.

For example, a reference clock running at 66 MHz is suitable for use with a link "A" clock running at 33 MHz, and a link "B" clock is running at 11 MHz. That is, the 66 MHz frequency of the reference clock 702 is exactly 2 times the frequency of the link "A" clock 704 and exactly 6 times the frequency of the link "B" clock 706. As the foregoing suggests, a reference clock running at 66 MHz would also be compatible with a link clock running at 22 MHz, for example, since the reference clock in that case would have a frequency exactly 3 times that of the 22 MHz clock.

Moreover, in the aforementioned examples at least, the link clocks can run independently of each other, and need not be synchronized with each other. Finally, when the reference clock frequency is selected so that it is an integer multiple of each of the link clock frequencies, both the chronology and timing, at least to within the reference clock rate, of the captured date events are preserved by timestamping the captured events in accordance with the reference clock.

Thus, the reference clock speed can be determined based upon the respective frequencies of the link clocks employed in the multi-protocol communications system. Conversely, if the reference clock frequency has been determined, or is fixed, compatible link clock speeds can readily be derived from the known reference clock frequency. Further, some reference clock frequencies may be somewhat more flexible than others in that they are divisible by a relatively greater number of integers. Thus, a variety of factors may inform the selection and implementation of a particular reference clock.

In at least some implementations, the protocol analyzer is configured to automatically detect and evaluate a new link in the multi-protocol communications system. Once the new link has been detected and evaluated, the protocol analyzer can then modify the reference clock frequency, if necessary, to accommodate the clock frequency of the new link. In this way, the multi-protocol communications system can be automatically reconfigured with the optimal reference clock without necessitating system down time or reprogramming.

V. Exemplary Processes and Operations

Figure 8:
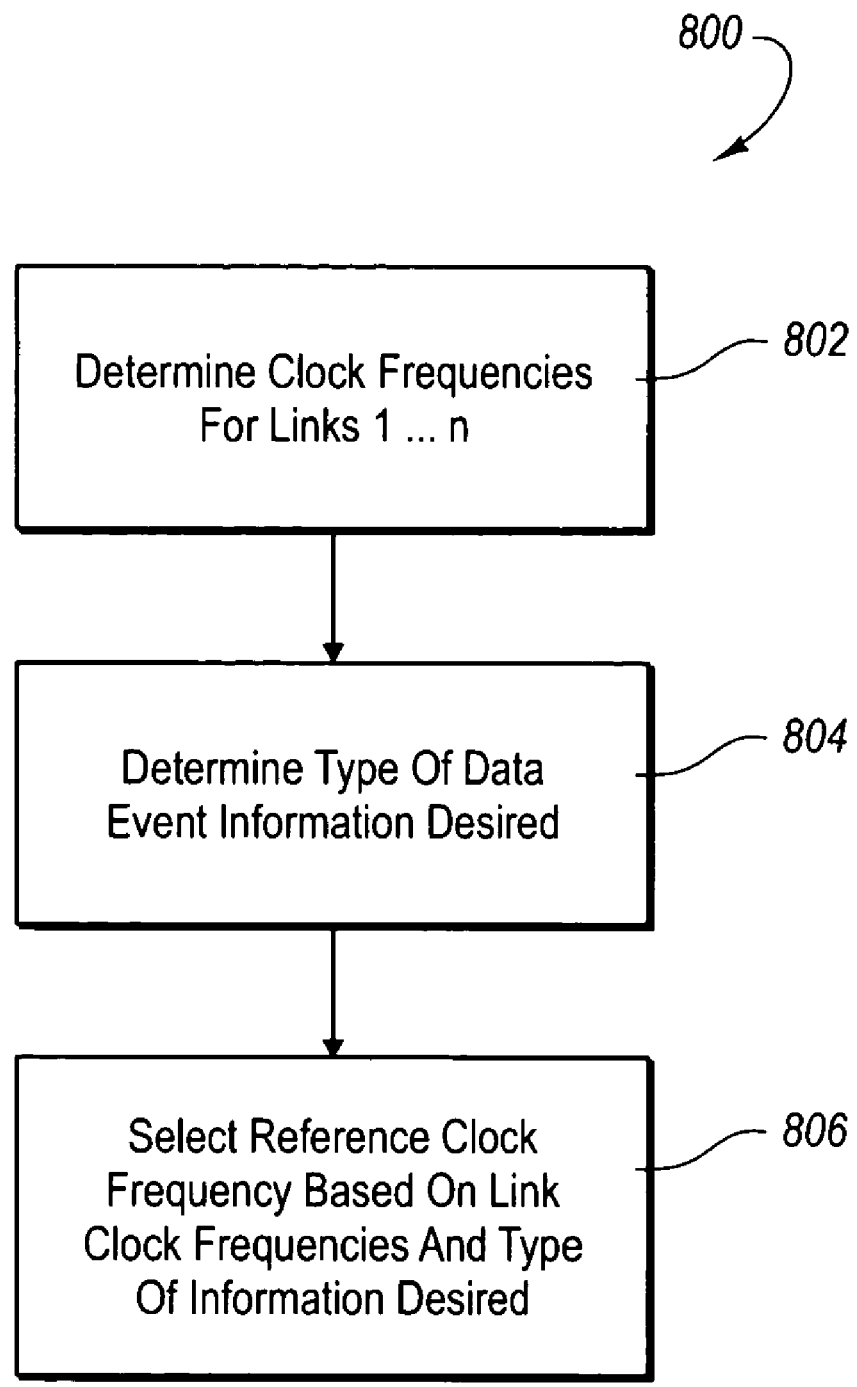
FIG. 8 is a flow diagram indicating aspects of a process for defining a reference clock frequency.

With attention now to FIG. 8, details are provided concerning an exemplary process 800 for determining a reference clock frequency. At stage 802 of the process, the respective clock frequencies for each of the links are determined. As noted earlier, such clock frequencies are a function of the particular communications protocol employed by the link.

Once the various clock frequencies have been identified, the process 800 advances to stage 804 where a determination is made as to the particular type of information desired to be obtained concerning data events in the network. The type of information can then be used as a guide to determining reference clock frequency. By way of example, some situations may only call for chronological information concerning data events in the multi-protocol communications system. In other cases however, more detailed information, such as both the chronology and timing of captured data events, may be required.

In any event, determination of the type of data event information desired causes the process 800 to advance to stage 806. At this stage, the reference clock frequency is determined based upon the information desired to be obtained concerning data events in the multi-protocol communications system. For example, if only information concerning data event chronology is needed, the reference clock frequency can be any frequency that is greater than the highest frequency of any link clock. As another example, if both data event chronology and timing information is desired, the reference clock frequency should be a frequency that is an integer multiple of each of the link clock frequencies. Of course, various other criteria may be used as well to guide selection of a reference clock frequency.

Figure 9:
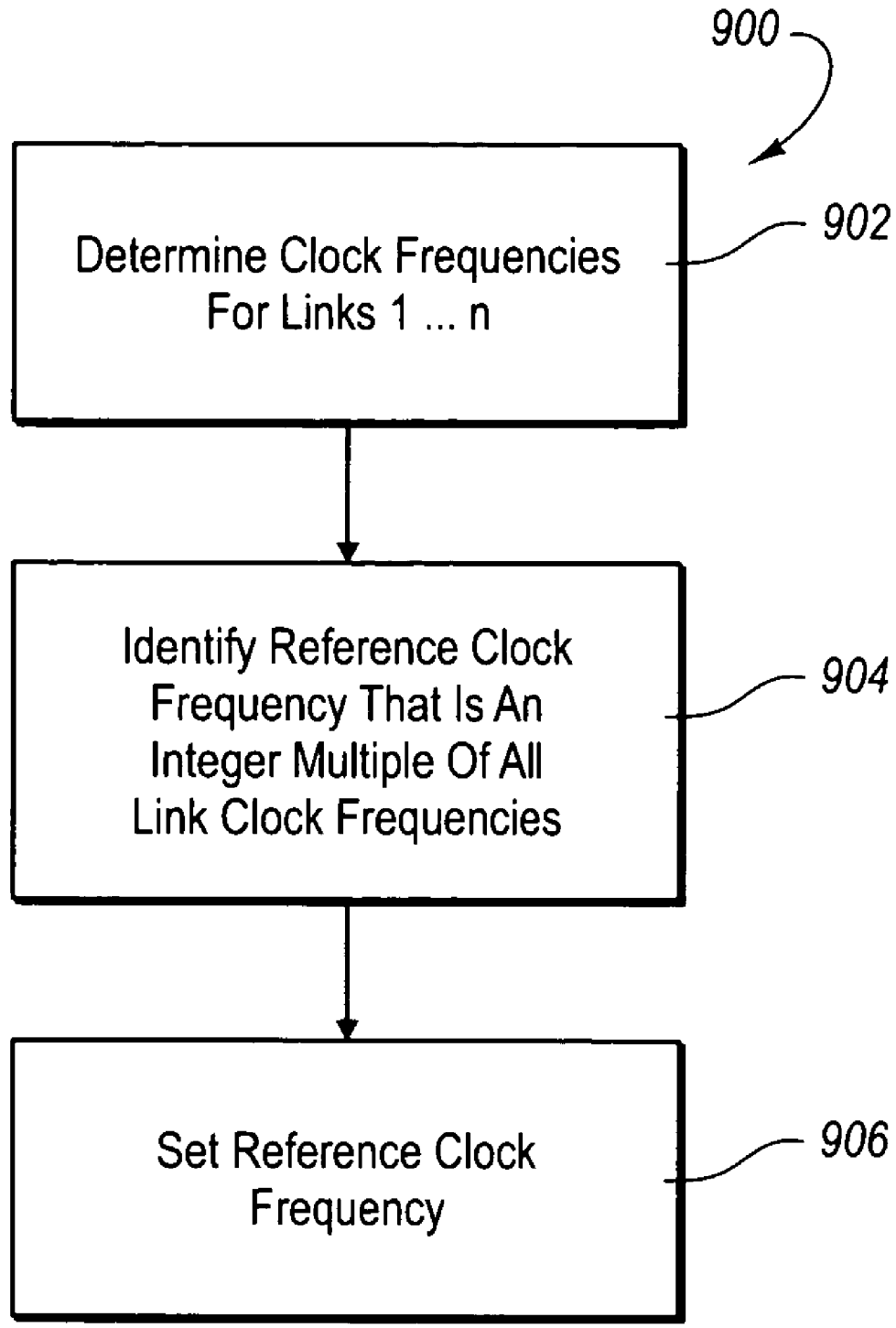
FIG. 9 is a flow diagram indicating aspects of another process for defining a reference clock frequency.

In some cases, it may be desirable to specify certain defaults in connection with the determination of a reference clock frequency. With attention now to FIG. 9, an example of a process 900 for determining a reference clock frequency, in connection with a specified default, is indicated.

At stage 902 of the process 900, the respective clock frequencies for each of the links are determined. The process 900 then advances to stage 904 where a reference clock frequency is identified that is an integer multiple of each of the link clock frequencies, and that meets any other specified criteria. At stage 906 of the process 900, the reference clock frequency is set. In many cases, the reference clock frequency is set to default to, for example, the lowest frequency that is an integer multiple of each of the link clock frequencies. In other cases however, it may be desirable to use other than the lowest possible reference clock frequency.

Figure 10:
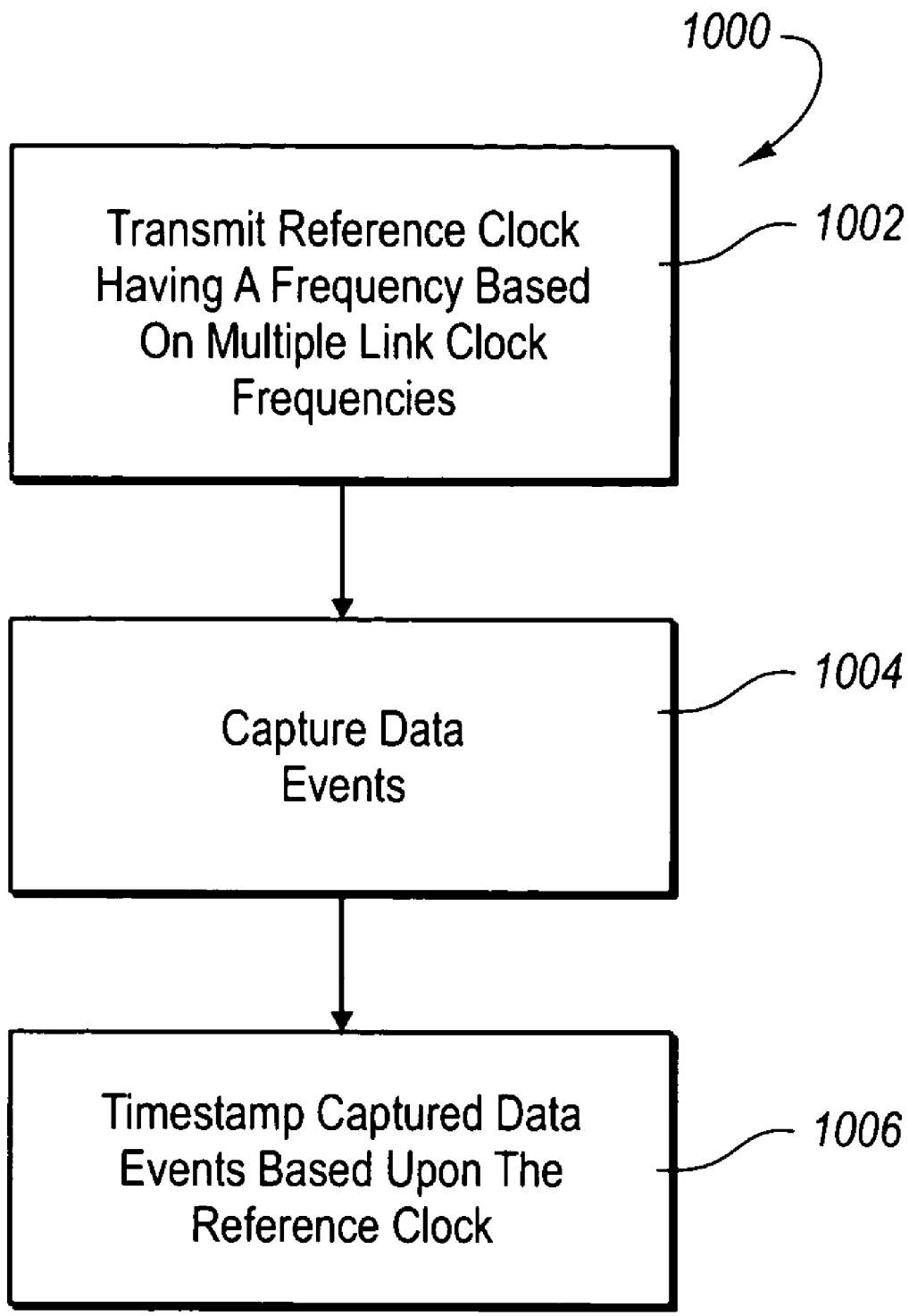
FIG. 10 is a flow diagram indicating aspects of a process for use of a reference clock by a multi-link protocol analyzer.

As disclosed herein, the use of a reference clock having a frequency that is based upon the link clock frequencies in a multi-protocol communications system is useful in timestamping captured data events. Accordingly, attention is directed now to FIG. 10 which illustrates aspects of an exemplary process 1000 for one use of such a reference clock.

In particular, the process 1000 commences at stage 1002 where a reference clock is transmitted, for example, from one link analyzer to another. The frequency of the transmitted reference clock is based upon the frequencies of the various link clocks employed in the multi-protocol communications system. In at least some cases, the transmission of the reference clock is performed as a result of the occurrence of one or more redefined events concerning the data stream of the multi-protocol communications system.

In connection with transmission of the reference clock at stage 1002, various data events are captured at stage 1004. Typically, data event capture at stage 1004 occurs either after, or substantially simultaneously with, transmission of the reference clock. In either case however, the process 1000 then advances to stage 1006 where captured data events are stamped at the time of capture with a timestamp that is based upon the reference clock.

Thus, notwithstanding the use of multiple link clock frequencies, data rates and communications protocols in the multi-protocol communications system, the common time base provided by the reference clock provides a vehicle for effective analysis and ordering of data events and related effects that occur in the multi-protocol communications system. Moreover, the use of link clock frequencies as a basis for determination of the reference clock frequency helps to ensure tailoring of the reference clock to specific situations and systems.

VI. Computing Environments, Hardware and Software

In at least some cases, some or all of the functionality disclosed herein may be implemented in connection with various combinations of computer hardware and software. For example, at least some protocol analyzers use hard coded devices such as field programmable gate arrays ("FPGA") to implement reference clock frequency determinations, timestamping, and data capture functionality. Other protocol analyzers employ both hardware and software to implement various functions disclosed herein.

With respect to computing environments and related components, at least some embodiments of the present invention may be implemented in connection with a special purpose or general purpose computer that is adapted for use in connection with communications systems. Embodiments within the scope of the present invention also include computer-readable media for carrying or having computer-executable instructions or electronic content structures stored thereon, and these terms are defined to extend to any such media or instructions.

By way of example such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device such a link analyzer or multi-link protocol analyzer, or computing device, to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

The invention claimed is:

1. A method for defining a common time base suitable for use in connection with the operation of a multi-link protocol analyzer in a multi-protocol communications system, the method comprising:
    determining a first protocol clock frequency at a first link analyzer of the multi-link protocol analyzer, the first protocol clock frequency being associated with a first communications protocol associated with the multi-protocol communications system;
    determining a second protocol clock frequency at a second link analyzer of the multi-link protocol analyzer, the second protocol clock frequency being associated with a second communications protocol associated with the multi-protocol communications system, wherein the second protocol clock frequency is unrelated to the first protocol clock frequency; and
    using the first and second protocol clock frequencies as a basis for determining a reference clock frequency, where the reference clock frequency is different from each of the first and second protocol clock frequencies, wherein using the first and second protocol clock frequencies as the basis for determining the reference clock frequency comprises selecting a reference clock frequency that is an integer multiple of each of the first and second protocol clock frequencies.

2. The method as recited in claim 1, wherein using the first and second protocol clock frequencies as the basis for determining the reference clock frequency comprises selecting the reference clock frequency to be higher than the first and second protocol clock frequencies.

3. The method as recited in claim 1, wherein the first and second communications protocols includes at least one of the following communications protocols: Infiniband; Gigabit Ethernet; SONET; Fibre Channel; and, PCI Express.

4. The method as recited in claim 1, further comprising using the reference clock frequency as the basis to determine at least one of the following: a relative chronological order of selected data events concerning the multi-protocol communications system; and, relative timing of selected data events concerning the multi-protocol communications system.

5. A protocol analyzer configured for use in connection with processing data events associated with a multi-protocol communications system, the protocol analyzer comprising:
    a first link analyzer configured to receive data from a first communication link, wherein the first link is associated with a first protocol clock frequency, the first protocol clock frequency being associated with a first communication protocol; and
    a second link analyzer in at least indirect communication with the first link analyzer and configured to receive data from a second communication link, wherein the second link is associated with a second protocol clock frequency, the second protocol clock frequency being associated with a second communication protocol, the second protocol clock frequency being unrelated to the first protocol clock frequency;
    wherein each of the first and second link analyzers are also configured to receive and transmit a trigger and a reference clock, and each of the first and second link analyzers are further being configured to timestamp data in association with the reference clock, wherein the reference clock is defined determined by the first and second protocol clock frequencies, the reference clock being different from each of the first and second protocol clock frequencies, wherein the reference clock has a frequency that is an integer multiple of each of the first and second protocol clock frequencies associated with the multi-protocol communications system.

6. The protocol analyzer as recited in claim 5, wherein at least one of the link analyzers is configured to generate the reference clock.

7. The protocol analyzer as recited in claim 5, wherein at least one of the link analyzers is configured to generate the trigger.

8. The protocol analyzer as recited in claim 5, wherein the reference clock has a frequency that is higher than the first and second protocol clock frequencies.

* * * * *